(12) United States Patent
Iwashita et al.

(10) Patent No.: US 12,106,406 B2
(45) Date of Patent: Oct. 1, 2024

(54) REAL-TIME DATA PROCESSING DEVICE

(71) Applicant: DENTSU INC., Tokyo (JP)

(72) Inventors: Satoru Iwashita, Tokyo (JP); Noritaka Kobuse, Tokyo (JP); Akimichi Hibi, Tokyo (JP); Naoto Shigemasa, Tokyo (JP); Susumu Tomita, Tokyo (JP); Keishi Nagasaku, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 17/996,416

(22) PCT Filed: Oct. 4, 2021

(86) PCT No.: PCT/JP2021/036544
§ 371 (c)(1),
(2) Date: Oct. 17, 2022

(87) PCT Pub. No.: WO2022/264440
PCT Pub. Date: Dec. 22, 2022

(65) Prior Publication Data
US 2024/0212233 A1   Jun. 27, 2024

(30) Foreign Application Priority Data
Jun. 18, 2021   (JP) .................................. 2021-101804

(51) Int. Cl.
*G09G 5/00* (2006.01)
*G06F 3/04883* (2022.01)
(Continued)

(52) U.S. Cl.
CPC ........ *G06T 11/203* (2013.01); *G06F 3/04883* (2013.01); *G06F 3/167* (2013.01); *G06T 9/00* (2013.01)

(58) Field of Classification Search
CPC ..... G06T 11/203; G06T 9/00; G06F 3/04883; G06F 3/167
(Continued)

(56) References Cited

U.S. PATENT DOCUMENTS 5,101,436 A    3/1992  DeAguiar et al.
7,636,097 B1  12/2009  Holloway
(Continued)

FOREIGN PATENT DOCUMENTS

CN    103797812 A    5/2014
CN    104281444 A    1/2015
(Continued)

OTHER PUBLICATIONS

Written Opinion of the International Searching Authority issued in PCT/JP2021/036544; mailed Dec. 14, 2021; re-submitted with an English translation.
(Continued)

*Primary Examiner* — Jennifer T Nguyen
(74) *Attorney, Agent, or Firm* — Studebaker & Brackett PC (57) ABSTRACT

In a real-time data processing device (1), when a camera video is inputted as video data in a raster format and a hand-drawing input is inputted as drawing data in a vector format, inverted video data in the raster format and inverted drawing data in the vector format are generated, a display of the drawing data in the vector format is made in a drawing area (A1) of a touch panel unit, and a superimposed display of the inverted video data in the raster format and the inverted drawing data in the vector format is made in a preview area (A2). Drawing data in the raster format is generated by performing encoding processing of the drawing data in the vector format, and composite data to be stored is generated by performing rendering processing of the
(Continued)

video data in the raster format and the drawing data in the raster format.

4 Claims, 3 Drawing Sheets

(51) Int. Cl.
    *G06F 3/16*     (2006.01)
    *G06T 9/00*     (2006.01)
    *G06T 11/20*     (2006.01)

(58) Field of Classification Search
    USPC .......................................................... 345/173
    See application file for complete search history.

(56) References Cited

U.S. PATENT DOCUMENTS

| | | | |
|---|---|---|---|
| 11,645,804 B2* | 5/2023 | Huang | H04N 21/4223 345/473 |
| 2004/0145654 A1* | 7/2004 | Motohashi | G06F 3/1454 348/14.02 |
| 2006/0242676 A1 | 10/2006 | Hoshino | |
| 2014/0215512 A1 | 7/2014 | Maruyama et al. | |
| 2015/0012812 A1 | 1/2015 | Wu et al. | |
| 2015/0029224 A1 | 1/2015 | Ise et al. | |
| 2017/0278549 A1 | 9/2017 | Tamura et al. | |
| 2018/0060689 A1* | 3/2018 | Sklaroff | G06V 30/1423 |
| 2020/0219294 A1* | 7/2020 | Badr | H04N 7/147 |

FOREIGN PATENT DOCUMENTS

| | | |
|---|---|---|
| CN | 112613283 A | 4/2021 |
| EP | 0656726 A1 | 6/1995 |
| JP | 2005-051703 A | 2/2005 |
| JP | 2015-027055 A | 2/2015 |
| JP | 2017-090478 A | 5/2017 |
| JP | 2017-175419 A | 9/2017 |
| WO | 2007/034822 A1 | 3/2007 |
| WO | 2015/094587 A1 | 6/2015 |
| WO | 2018/084715 A1 | 5/2018 |

OTHER PUBLICATIONS

International Search Report; Written Opinion; and Notification of Transmittal of the International Search Report and the Written Opinion of the International Searching Authority, or the Declaration issued in PCT/JP2021/036544; mailed Feb. 14, 2021.
"Notice of Reasons for Refusal" Office Action issued in JP 2021-101804; mailed by the Japanese Patent Office on Sep. 28, 2021.
"Decision to Grant a Patent" Office Action issued in JP 2021-101804; mailed by the Japanese Patent Office on Feb. 8, 2022.
Office Action issued in TW 110139447; mailed by the Taiwan Intellectual Property Office on Jul. 26, 2022.
Apple Almond; "iPhone front camera selfie will be upside down? How to enable Front Lens Mirror Flip Settings"; iOS Area; Apple Ren; Aug. 9, 2020; <URL: https://applealmond.com/posts/75751>.
International Search Report issued in PCT/JP2021/036544; mailed Dec. 14, 2021; re-submitted with an English translation.
The extended European search report issued by the European Patent Office on Apr. 29, 2024, which corresponds to European Patent Application No. 21927045.1-1207 and is related to U.S. Appl. No. 17/996,416.
Fernando Silva-Coira et al., "Efficient processing of raster and vector data", arXiv.org, Cornell University Library, Ithaca, NY, Dec. 26, 2019, total 36 pages, XP081636890.
Shlien et al., "Raster to polygon conversion of images", Computers & Graphics, Elsevier, vol. 7, No. 3-4, Jan. 1, 1983, pp. 327-332, XP026659442.
Hui Dong et al., "One rasterization approach algorithm for high performance map overlay", 2009 17th International Conference on Geoinformatics, IEEE, Aug. 12, 2009, pp. 1-6, XP031607641.

* cited by examiner

REAL-TIME DATA PROCESSING DEVICE

TECHNICAL FIELD

The present invention relates to a real-time data processing device including a real-time preview function capable of displaying video data (in-camera video) and drawing data (hand-drawing input) in a superimposing manner.

BACKGROUND ART

Conventionally, a method for displaying a camera video and a hand-drawing input in a superimposing manner has been proposed (for example, see Patent Literature 1). In the conventional method, video data (composite video data) in which a drawing made by a broadcaster is superimposed on video data from a camera is generated in a live-streaming method in which a live broadcast is delivered via a network.

When two data are combined, the same data format is generally used although no data format is specified in the conventional method. For a data format of the video data from the camera, a raster format is used in general. Accordingly, in the conventional method, it can be thought that the raster format is used for a data format of the drawing data made by the broadcaster, in general. No reason is found for bothering to use different data formats also because an object of the convention method is to implement a broadcast with high expressiveness at low cost. Moreover, to efficiently generate the composite video data to be outputted to a network for viewers, it can also be thought that the same raster format as the format of the video data is used for the data format of the drawing data in the conventional method.

In the conventional method, no technique for previewing the composite video data in real time is proposed, and no technique for reducing a processing load for a real-time preview is proposed either. When a preview of composite video data is made in real time, it is difficult, in some cases, for a relatively low-throughput device (for example, a tablet device or the like with lower throughput than a PC) to perform real-time processing when the device attempts to perform processing for displaying drawing data by using the raster format because the processing is heavy. To allow even a low-throughput device to perform real-time processing, resolution of data needs to be lowered, but then, resolution of data outputted to the network for viewers becomes insufficient.

CITATION LIST

Patent Literature

[Patent Literature 1] Japanese Patent Laid-Open No. 2005-51703 (paragraphs 0203 to 0210, FIGS. 12 to 13)

SUMMARY OF INVENTION

Technical Problem

The present invention has been made in view of the above-described background. An object of the present invention is to provide a real-time data processing device that can reduce a processing load for a real-time preview, and can generate high-resolution composite data.

Solution to Problem

An aspect of the present invention is a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the real-time data processing device including: a video data input section into which the video captured by the in-camera unit is inputted as video data in a raster format; a video inversion processing section that inverts the video data in the raster format inputted from the video data input section and generates inverted video data in the raster format; a drawing data input section into which the hand-drawing input inputted from the touch panel unit is inputted as drawing data in a vector format; a drawing inversion processing section that inverts the drawing data in the vector format inputted from the drawing data input section and generates inverted drawing data in the vector format; a voice data input section into which the voice of the user inputted from the microphone unit is inputted as voice data; a real-time preview processing section that makes a display, in the drawing area of the touch panel unit, of the drawing data in the vector format inputted from the drawing data input section, makes a superimposed display, in the preview area of the touch panel unit, of the inverted video data in the raster format generated by the video inversion processing section and the inverted drawing data in the vector format generated by the drawing inversion processing section, and outputs the voice data inputted from the voice data input section; an encoding processing section that performs encoding processing of the drawing data in the vector format inputted from the drawing data input section and generates drawing data in the raster format; and a rendering processing section that performs rendering processing of the video data in the raster format inputted from the video data input section, the drawing data in the raster format generated by the encoding processing section, and the voice data inputted from the voice data input section and generates composite data to be stored.

Another aspect of the present invention is a method performed by a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the method including: a video data input step of inputting the video captured by the in-camera unit as video data in a raster format; a drawing data input step of inputting the hand-drawing input inputted from the touch panel unit as drawing data in a vector format; a voice data input step of inputting the voice of the user inputted from the microphone unit as voice data; a video inversion processing step of inverting the video data in the raster format inputted in the video data input step and generating inverted video data in the raster format; a drawing inversion processing step of inverting the drawing data in the vector format inputted in the drawing data input step and generating inverted drawing data in the vector format; a real-time preview processing step of making a display, in the drawing area of the touch panel unit, of the drawing data in the vector format inputted in the drawing data input step, making a superimposed display, in the preview area of the touch panel unit, of the inverted video data in the raster format generated in the video inversion processing step and the inverted drawing data in the vector format generated in the drawing inversion processing step, and outputting the voice data inputted in the voice data input step; an encoding processing step of performing encoding processing of the drawing data in the vector format inputted in the drawing data input step and generating drawing data in the raster format; and a rendering processing step of performing rendering processing of the video data in the raster format inputted in the video data input step, the drawing data in the raster format generated in the encoding processing step, and the voice data inputted in the voice data input step and generating composite data to be stored.

Another aspect of the present invention is a program executed by a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the program causing the real-time data processing device to perform: a video data input process in which the video captured by the in-camera unit is inputted as video data in a raster format; a drawing data input process in which the hand-drawing input inputted from the touch panel unit is inputted as drawing data in a vector format; a voice data input process in which the voice of the user inputted from the microphone unit is inputted as voice data; a video inversion process that inverts the video data in the raster format inputted in the video data input process and generates inverted video data in the raster format; a drawing inversion process that inverts the drawing data in the vector format inputted in the drawing data input process and generates inverted drawing data in the vector format; a real-time preview process that makes a display, in the drawing area of the touch panel unit, of the drawing data in the vector format inputted in the drawing data input process, makes a superimposed display, in the preview area of the touch panel unit, of the inverted video data in the raster format generated in the video inversion process and the inverted drawing data in the vector format generated in the drawing inversion process, and outputs the voice data inputted in the voice data input process; an encoding process that performs encoding processing of the drawing data in the vector format inputted in the drawing data input process and generates drawing data in the raster format; and a rendering process that performs rendering processing of the video data in the raster format inputted in the video data input process, the drawing data in the raster format generated in the encoding process, and the voice data inputted in the voice data input process and generates composite data to be stored.

There are other aspects of the present invention as described below. Accordingly, the disclosure of the invention is intended to provide some aspects of the present invention, and is not intended to limit the scope of the invention described and claimed herein.

DESCRIPTION OF EMBODIMENTS

Hereinafter, a detailed description of the present invention is given. However, the detailed description below and the accompanying drawings do not limit the invention.

A real-time data processing device of the present invention is a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the real-time data processing device including: a video data input section into which the video captured by the in-camera unit is inputted as video data in a raster format; a video inversion processing section that inverts the video data in the raster format inputted from the video data input section and generates inverted video data in the raster format; a drawing data input section into which the hand-drawing input inputted from the touch panel unit is inputted as drawing data in a vector format; a drawing inversion processing section that inverts the drawing data in the vector format inputted from the drawing data input section and generates inverted drawing data in the vector format; a voice data input section into which the voice of the user inputted from the microphone unit is inputted as voice data; a real-time preview processing section that makes a display, in the drawing area of the touch panel unit, of the drawing data in the vector format inputted from the drawing data input section, makes a superimposed display, in the preview area of the touch panel unit, of the inverted video data in the raster format generated by the video inversion processing section and the inverted drawing data in the vector format generated by the drawing inversion processing section, and outputs the voice data inputted from the voice data input section; an encoding processing section that performs encoding processing of the drawing data in the vector format inputted from the drawing data input section and generates drawing data in the raster format; and a rendering processing section that performs rendering processing of the video data in the raster format inputted from the video data input section, the drawing data in the raster format generated by the encoding processing section, and the voice data inputted from the voice data input section and generates composite data to be stored.

According to such a configuration, in a real-time preview, the superimposed display using the inverted video data in the raster format and the inverted drawing data in the vector format is made in the preview area of the touch panel unit. Since data in the vector format is used for displaying the hand-drawing input, a display processing load can be lightened, compared to a case of using the raster format. Accordingly, although some processing, such as lowering resolution, has been required to lighten a processing load when the raster format is used, such processing is not required.

Moreover, since the drawing data is inverted (the inverted drawing data is used) to be commensurate with the video data (inverted video data) displayed in the preview area, the user can be prevented from feeling that the display in the preview area is discordant.

Further, at the time, since the display using the drawing data (non-inverted drawing data) in the vector format is made in the drawing area of the touch panel unit, the user can easily check the own hand-drawing input, without feeling strangeness.

Then, the composite data to be stored is generated by using the drawing data in the raster format generated from the drawing data in the vector format. Thus, a processing load for the real-time preview can be lightened, and the high-resolution composite data can be generated.

In the real-time data processing device of the present invention, the real-time preview processing section may make the superimposed display in the preview area by disposing the inverted video data in the raster format generated by the video inversion processing section at a lower layer and disposing the inverted drawing data in the vector format generated by the drawing inversion processing section at an upper layer.

According to such a configuration, in the superimposed display in the preview area, the inverted video data in the raster format is disposed at the lower layer, and the inverted drawing data in the vector format is disposed at the upper layer. By making such a superimposed display using multiple layers, a processing load for the superimposed display in the preview area can be lightened.

A method of the present invention is a method performed by a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the method including: a video data input step of inputting the video captured by the in-camera unit as video data in a raster format; a drawing data input step of inputting the hand-drawing input inputted from the touch panel unit as drawing data in a vector format; a voice data input step of inputting the voice of the user inputted from the microphone unit as voice data; a video inversion processing step of inverting the video data in the raster format inputted in the video data input step and generating inverted video data in the raster format; a drawing inversion processing step of inverting the drawing data in the vector format inputted in the drawing data input step and generating inverted drawing data in the vector format; a real-time preview processing step of making a display, in the drawing area of the touch panel unit, of the drawing data in the vector format inputted in the drawing data input step, making a superimposed display, in the preview area of the touch panel unit, of the inverted video data in the raster format generated in the video inversion processing step and the inverted drawing data in the vector format generated in the drawing inversion processing step, and outputting the voice data inputted in the voice data input step; an encoding processing step of performing encoding processing of the drawing data in the vector format inputted in the drawing data input step and generating drawing data in the raster format; and a rendering processing step of performing rendering processing of the video data in the raster format inputted in the video data input step, the drawing data in the raster format generated in the encoding processing step, and the voice data inputted in the voice data input step and generating composite data to be stored.

According to the method as well, as described above, in a real-time preview, the superimposed display using the inverted video data in the raster format and the inverted drawing data in the vector format is made in the preview area of the touch panel unit. Since data in the vector format is used for displaying the hand-drawing input, a display processing load can be lightened, compared to a case of using the raster format.

Accordingly, although some processing, such as lowering resolution, has been required to lighten a processing load when the raster format is used, such processing is not required.

Moreover, since the drawing data is inverted (the inverted drawing data is used) to be commensurate with the video data (inverted video data) displayed in the preview area, the user can be prevented from feeling that the display in the preview area is discordant.

Further, at the time, since the display using the drawing data (non-inverted drawing data) in the vector format is made in the drawing area of the touch panel unit, the user can easily check the own hand-drawing input, without feeling strangeness.

Then, the composite data to be stored is generated by using the drawing data in the raster format generated from the drawing data in the vector format. Thus, a processing load for the real-time preview can be lightened, and the high-resolution composite data can be generated.

A program of the present invention is a program executed by a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the program causing the real-time data processing device to perform: a video data input process in which the video captured by the in-camera unit is inputted as video data in a raster format; a drawing data input process in which the hand-drawing input inputted from the touch panel unit is inputted as drawing data in a vector format; a voice data input process in which the voice of the user inputted from the microphone unit is inputted as voice data; a video inversion process that inverts the video data in the raster format inputted in the video data input process and generates inverted video data in the raster format; a drawing inversion process that inverts the drawing data in the vector format inputted in the drawing data input process and generates inverted drawing data in the vector format; a real-time preview process that makes a display, in the drawing area of the touch panel unit, of the drawing data in the vector format inputted in the drawing data input process, makes a superimposed display, in the preview area of the touch panel unit, of the inverted video data in the raster format generated in the video inversion process and the inverted drawing data in the vector format generated in the drawing inversion process, and outputs the voice data inputted in the voice data input process; an encoding process that performs encoding processing of the drawing data in the vector format inputted in the drawing data input process and generates drawing data in the raster format; and a rendering process that performs rendering processing of the video data in the raster format inputted in the video data input process, the drawing data in the raster format generated in the encoding process, and the voice data inputted in the voice data input process and generates composite data to be stored.

According to the program as well, as described above, in a real-time preview, the superimposed display using the inverted video data in the raster format and the inverted drawing data in the vector format is made in the preview area of the touch panel unit. Since data in the vector format is used for displaying the hand-drawing input, a display processing load can be lightened, compared to a case of using the raster format. Accordingly, although some processing, such as lowering resolution, has been required to lighten a processing load when the raster format is used, such processing is not required.

Moreover, since the drawing data is inverted (the inverted drawing data is used) to be commensurate with the video data (inverted video data) displayed in the preview area, the user can be prevented from feeling that the display in the preview area is discordant.

Further, at the time, since the display using the drawing data (non-inverted drawing data) in the vector format is made in the drawing area of the touch panel unit, the user can easily check the own hand-drawing input, without feeling strangeness.

Then, the composite data to be stored is generated by using the drawing data in the raster format generated from the drawing data in the vector format. Thus, a processing load for the real-time preview can be lightened, and the high-resolution composite data can be generated.

According to the present invention, a processing load for a real-time preview can be lightened, and high-resolution composite data can be generated.

EMBODIMENT

Hereinafter, a real-time data processing device in an embodiment of the present invention is described by using the drawings. The present embodiment illustrates a case of a real-time data processing device (for example, a tablet device or the like) used for a service providing an application that combines a camera video and a drawing in real time (for example, a service providing an application that connects an athlete, a celebrity, or the like with fans, and that enables a camera video combined with a handwriting to be previewed in real time and to be encoded as a moving-image file, or the like).

Figure 1:
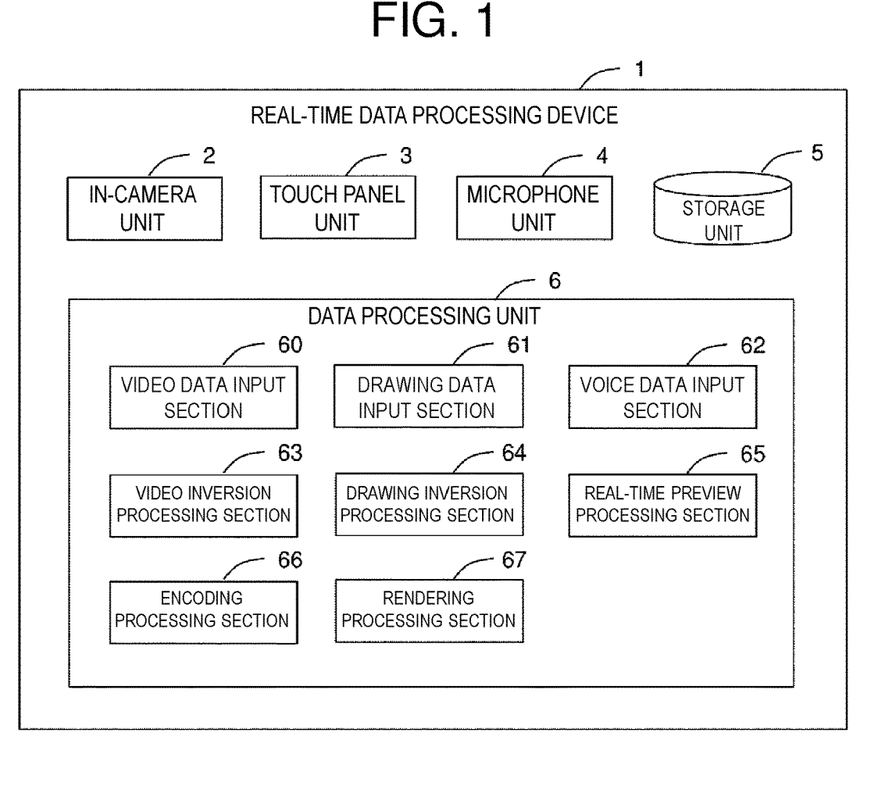
FIG. 1 is a block diagram of a real-time data processing device in an embodiment of the present invention.

A configuration of the real-time data processing device in the embodiment of the present invention is described with reference to a drawing. FIG. 1 is a block diagram of the real-time data processing device in the present embodiment. As shown in FIG. 1, the real-time data processing device 1 includes an in-camera unit 2, a touch panel unit 3, a microphone unit 4, a storage unit 5, and a data processing unit 6.

The in-camera unit 2 is configured by using, for example, an embedded camera or the like. The in-camera unit 2 is disposed on top of the touch panel unit 3 of the real-time data processing device 1, and includes a function of capturing a video of a user who is using the real-time data processing device 1. The in-camera unit 2 may be configured by using an external camera.

The touch panel unit 3 is configured by using, for example, a touch panel display or the like. The touch panel unit 3 includes a function of displaying the video captured by the in-camera unit 2 to the user, and a function of receiving a hand-drawing input made by the user. It can also be said that the touch panel unit 3 includes both a so-called display unit and an input unit. When the real-time data processing device 1 is set in a real-time preview mode, a drawing area A1, which is an area for receiving the hand-drawing input, and a preview area A2, which is an area for displaying the video captured by the in-camera unit 2, are provided on the touch panel unit 3 (see FIG. 3).

The microphone unit 4 is configured by using, for example, a microphone of a device built-in type or the like. Voice of the user who is using the real-time data processing device 1, and the like are inputted (a voice input is made) from the microphone unit 4.

The storage unit 5 is configured by using, for example, an HDD, a memory, or the like. Various data can be stored in the storage unit 5. A program that causes the real-time data processing device 1 to perform various processes is stored in the storage unit 5. The program stored in the storage unit 5 is executed, whereby real-time preview processing, which will be described later, is performed.

The data processing unit 6 is configured by using, for example, a CPU, an MPU, or the like, and includes a function of performing various data processing. More specifically, the data processing unit 6 includes, as functional blocks, a video data input section 60, a drawing data input section 61, a voice data input section 62, a video inversion processing section 63, a drawing inversion processing section 64, a real-time preview processing section 65, an encoding processing section 66, and a rendering processing section 67.

The video captured by the in-camera unit 2 is inputted into the video data input section 60, as video data in the raster format. The video inversion processing section 63 includes a function of inverting the video data in the raster format inputted from the video data input section 60 and generating inverted video data in the raster format. The hand-drawing input inputted from the touch panel unit 3 is inputted into the drawing data input section 61, as drawing data in the vector format. The drawing inversion processing section 64 includes a function of inverting the drawing data in the vector format inputted from the drawing data input section 61 and generating inverted drawing data in the vector format. The voice of the user inputted from the microphone unit 4 is inputted into the voice data input section 62, as voice data.

The real-time preview processing section 65 includes a function of, when the real-time data processing device 1 is set in the real-time preview mode, making a display (display in an original state) of the drawing data in the vector format inputted from the drawing data input section 61 in the drawing area A1 of the touch panel unit 3, making a superimposed display of the inverted video data in the raster format generated by the video inversion processing section 63 and the inverted drawing data in the vector format generated by the drawing inversion processing section 64 in the preview area A2 of the touch panel unit 3, and outputting the voice data inputted from the voice data input section 62.

When the real-time data processing device 1 is set in the real-time preview mode, the real-time preview processing section 65 makes the superimposed display in the preview area A2 by disposing the inverted video data in the raster format generated by the video inversion processing section 63 at a lower layer, and disposing the inverted drawing data in the vector format generated by the drawing inversion processing section 64 at an upper layer.

The encoding processing section 66 includes a function of performing encoding processing of the drawing data in the vector format inputted from the drawing data input section

61 and generating drawing data in the raster format. The rendering processing section 67 includes a function of performing rendering processing of the video data in the raster format inputted from the video data input section 60, the drawing data in the raster format generated by the encoding processing section 66, and the voice data inputted from the voice data input section 62, and generating composite data to be stored. The composite data generated through the rendering processing is stored in the storage unit 5.

Figure 2:
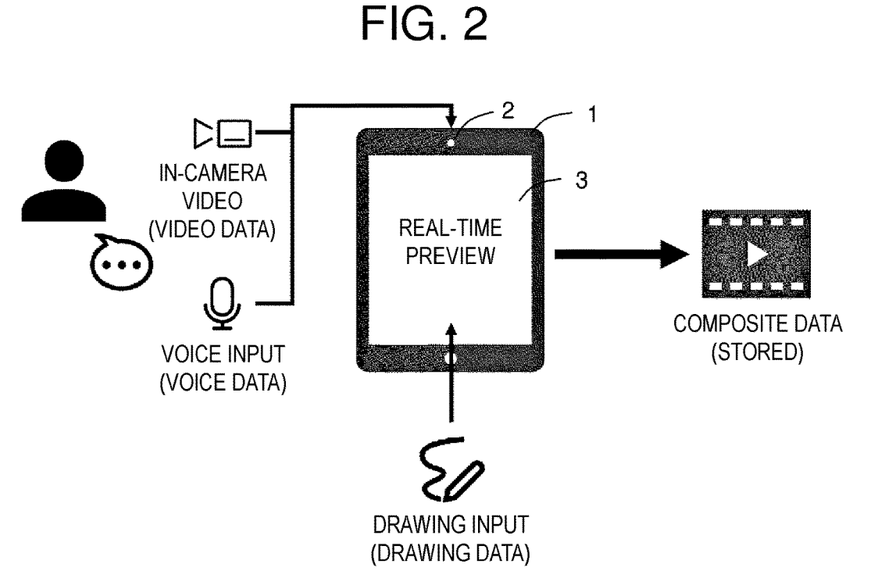
FIG. 2 is an explanatory diagram of processing performed by the real-time data processing device.
Figure 3:
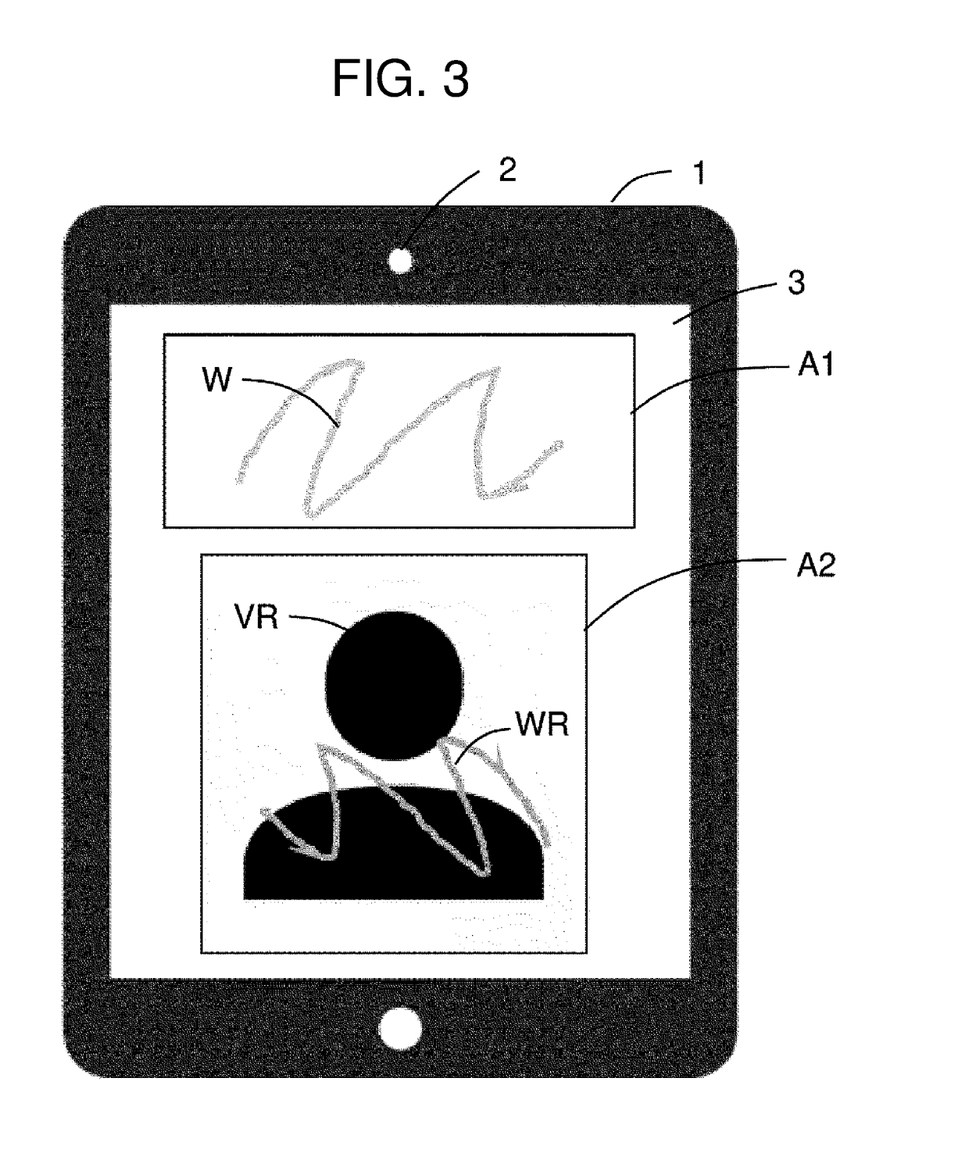
FIG. 3 shows an example of a display in real-time preview processing.
Figure 4:
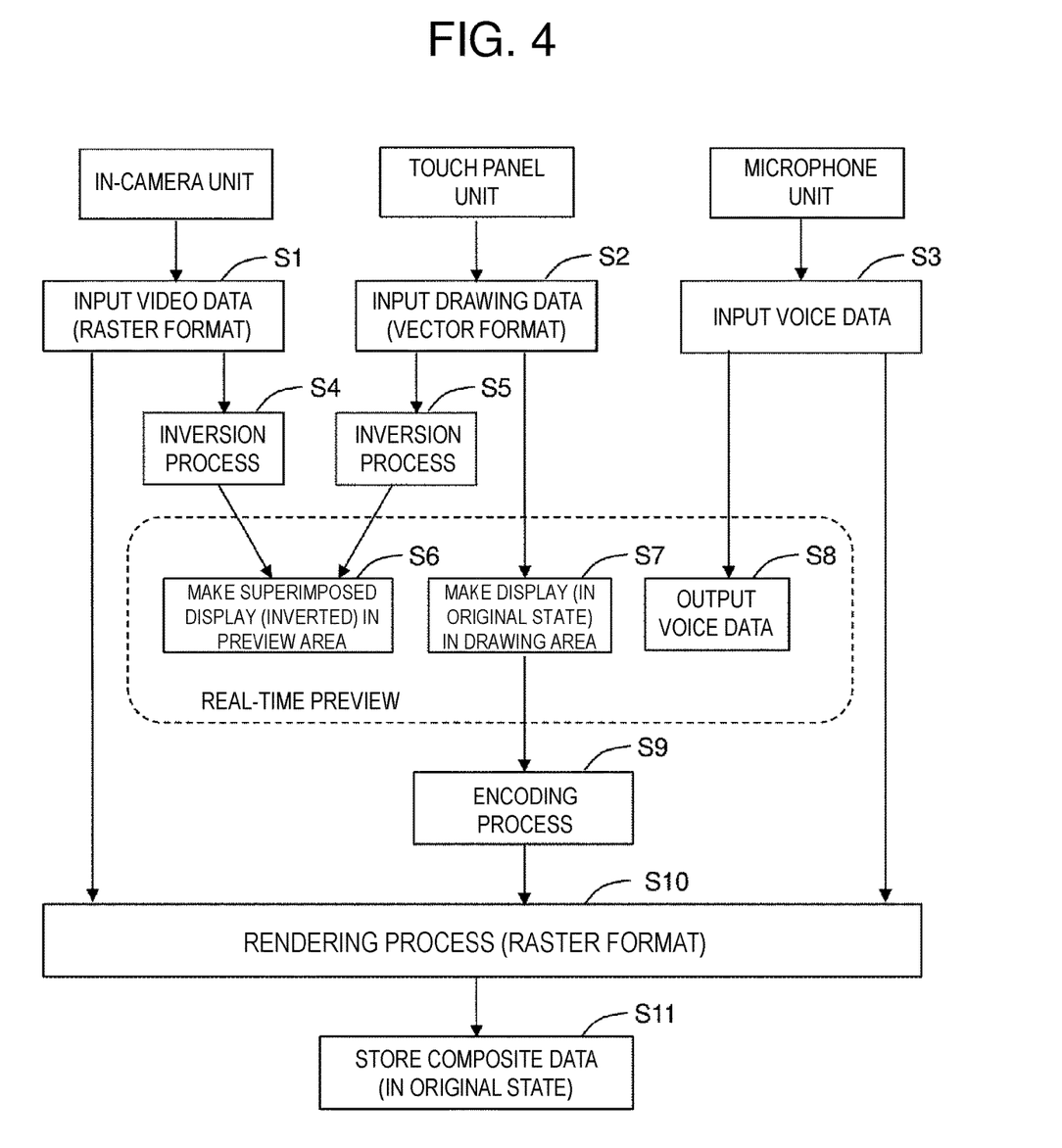
FIG. 4 is a flowchart showing a flow of the processing performed by the real-time data processing device.

Operation of the real-time data processing device 1 configured as described above is described with reference to drawings. FIG. 2 is an explanatory diagram of processing performed by the real-time data processing device 1, and FIG. 3 shows an example of a display in real-time preview processing. FIG. 4 is a flowchart showing a flow of the processing performed by the real-time data processing device 1.

As shown in FIGS. 2 and 4, in the real-time data processing device 1 in the present embodiment, a video captured by the in-camera unit 2 is inputted as video data in the raster format (S1), a hand-drawing input inputted from the touch panel unit 3 is inputted as drawing data in the vector format (S2), and voice of a user inputted from the microphone unit 4 is further inputted as voice data (S3).

Next, the video data in the raster format inputted in the step S1 is inverted, and inverted video data in the raster format is generated (S4). Moreover, the drawing data in the vector format inputted in the step S2 is inverted, and inverted drawing data in the vector format is generated (S5).

Then, a superimposed display of the inverted video data (inverted camera video VR) in the raster format generated in the step S4 and the inverted drawing data (inverted hand-drawing input WR) in the vector format generated in the step S5 is made in the preview area A2 of the touch panel unit 3 (S6) and a display of the drawing data (non-inverted hand-drawing input W) in the vector format inputted in the step S2 is made in the drawing area A1 of the touch panel unit 3 (S7) as shown in FIG. 3, and the voice data inputted in the step S3 is outputted (S8).

When the superimposed display in the preview area A2 is made in the step S6, the inverted video data (inverted camera video VR) in the raster format generated in the step S4 is disposed at a lower layer, and the inverted drawing data (inverted hand-drawing input WR) in the vector format generated in the step S5 is disposed at an upper layer.

Subsequently, the drawing data in the vector format inputted in the step S2 is subjected to encoding processing, and drawing data in the raster format is generated (S9). Then, the video data in the raster format inputted in the step S1, the drawing data in the raster format generated in the step S9, and the voice data inputted in the step S3 are subjected to rendering processing, and composite data to be stored is generated (S10). The generated composite data is stored in the storage unit 5 (S11).

According to the real-time data processing device 1 in the present embodiment as described above, in a real-time preview, the superimposed display using the inverted video data (inverted camera video VR) in the raster format and the inverted drawing data (inverted hand-drawing input WR) in the vector format is made in the preview area A2 of the touch panel unit 3. Since data in the vector format is used for displaying the hand-drawing input, a display processing load can be lightened, compared to a case of using the raster format. Accordingly, although some processing, such as lowering resolution, has been required to lighten a processing load when the raster format is used, such processing is not required.

Moreover, since the drawing data is inverted (the inverted drawing data (inverted hand-drawing input WR) is used) to be commensurate with the video data (inverted video data (inverted camera video VR)) displayed in the preview area A2, the user can be prevented from feeling that the display in the preview area A2 is discordant.

Further, at the time, since the display using the drawing data (non-inverted drawing data W) in the vector format is made in the drawing area A1 of the touch panel unit 3, the user can easily check the own hand-drawing input, without feeling strangeness.

Then, the composite data to be stored is generated by using the drawing data in the raster format generated from the drawing data in the vector format. Thus, a processing load for the real-time preview can be lightened, and the high-resolution composite data can be generated.

Furthermore, according to the present embodiment, in the superimposed display in the preview area A2, the inverted video data (inverted camera video VR) in the raster format is disposed at a lower layer, and the inverted drawing data (inverted hand-drawing input WR) in the vector format is disposed at an upper layer. By such a superimposed display using multiple layers being made, a processing load for the superimposed display in the preview area A2 can be lightened.

Although an embodiment of the present invention has been described illustratively hereinbefore, the scope of the present invention is not limited to the embodiment and the like, and changes and modifications can be made according to purposes within the scope of claims.

INDUSTRIAL APPLICABILITY

As described above, the real-time data processing device according to the present invention has advantageous effects of being able to lighten a processing load for a real-time preview and being able to generate high-resolution composite data, and is useful to be used for services such as a service providing an application that combines a camera video and a drawing in real time.

REFERENCE SIGNS LIST

1 Real-time data processing device
2 In-camera unit
3 Touch panel unit
4 Microphone unit
5 Storage unit
6 Data processing unit
60 Video data input section
61 Drawing data input section
62 Voice data input section
63 Video inversion processing section
64 Drawing inversion processing section
65 Real-time preview processing section
66 Encoding processing section
67 Rendering processing section
A1 Drawing area
A2 Preview area

The invention claimed is:
1. A real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the real-time data processing device comprising:

- a video data input section into which the video captured by the in-camera unit is inputted as video data in a raster format;
- a video inversion processing section that inverts the video data in the raster format inputted from the video data input section and generates inverted video data in the raster format;
- a drawing data input section into which the hand-drawing input inputted from the touch panel unit is inputted as drawing data in a vector format;
- a drawing inversion processing section that inverts the drawing data in the vector format inputted from the drawing data input section and generates inverted drawing data in the vector format;
- a voice data input section into which the voice of the user inputted from the microphone unit is inputted as voice data;
- a real-time preview processing section that makes a display, in the drawing area of the touch panel unit, of the drawing data in the vector format inputted from the drawing data input section, makes a superimposed display, in the preview area of the touch panel unit, of the inverted video data in the raster format generated by the video inversion processing section and the inverted drawing data in the vector format generated by the drawing inversion processing section, and outputs the voice data inputted from the voice data input section;
- an encoding processing section that performs encoding processing of the drawing data in the vector format inputted from the drawing data input section and generates drawing data in the raster format; and
- a rendering processing section that performs rendering processing of the video data in the raster format inputted from the video data input section, the drawing data in the raster format generated by the encoding processing section, and the voice data inputted from the voice data input section and generates composite data to be stored.

2. The real-time data processing device according to claim 1, wherein the real-time preview processing section makes the superimposed display in the preview area by disposing the inverted video data in the raster format generated by the video inversion processing section at a lower layer and disposing the inverted drawing data in the vector format generated by the drawing inversion processing section at an upper layer.

3. A method performed by a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, the method comprising:

- a video data input step of inputting the video captured by the in-camera unit as video data in a raster format;
- a drawing data input step of inputting the hand-drawing input inputted from the touch panel unit as drawing data in a vector format;
- a voice data input step of inputting the voice of the user inputted from the microphone unit as voice data;
- a video inversion processing step of inverting the video data in the raster format inputted in the video data input step and generating inverted video data in the raster format;
- a drawing inversion processing step of inverting the drawing data in the vector format inputted in the drawing data input step and generating inverted drawing data in the vector format;
- a real-time preview processing step of making a display, in the drawing area of the touch panel unit, of the drawing data in the vector format inputted in the drawing data input step, making a superimposed display, in the preview area of the touch panel unit, of the inverted video data in the raster format generated in the video inversion processing step and the inverted drawing data in the vector format generated in the drawing inversion processing step, and outputting the voice data inputted in the voice data input step;
- an encoding processing step of performing encoding processing of the drawing data in the vector format inputted in the drawing data input step and generating drawing data in the raster format; and
- a rendering processing step of performing rendering processing of the video data in the raster format inputted in the video data input step, the drawing data in the raster format generated in the encoding processing step, and the voice data inputted in the voice data input step and generating composite data to be stored.

4. A non-transitory computer readable storage medium that stores a program, wherein the program is executed by a processor included in a real-time data processing device including an in-camera unit that captures a video of a user who is using the device, a touch panel unit that is capable of displaying the video captured by the in-camera unit to the user and is capable of receiving a hand-drawing input made by the user, and a microphone unit into which voice of the user is inputted, the touch panel unit including a drawing area, which is an area for receiving the hand-drawing input, and a preview area, which is an area for displaying the video captured by the in-camera unit, and the program is executed by the processor to cause the real-time data processing device to perform:

- a video data input process in which the video captured by the in-camera unit is inputted as video data in a raster format;
- a drawing data input process in which the hand-drawing input inputted from the touch panel unit is inputted as drawing data in a vector format;
- a voice data input process in which the voice of the user inputted from the microphone unit is inputted as voice data;
- a video inversion process that inverts the video data in the raster format inputted in the video data input process and generates inverted video data in the raster format;
- a drawing inversion process that inverts the drawing data in the vector format inputted in the drawing data input process and generates inverted drawing data in the vector format;
- a real-time preview process that makes a display, in the drawing area of the touch panel unit, of the drawing data in the vector format inputted in the drawing data input process, makes a superimposed display, in the preview area of the touch panel unit, of the inverted video data in the raster format generated in the video inversion process and the inverted drawing data in the vector format generated in the drawing inversion process, and outputs the voice data inputted in the voice data input process;

an encoding process that performs encoding processing of the drawing data in the vector format inputted in the drawing data input process and generates drawing data in the raster format; and a rendering process that performs rendering processing of the video data in the raster format inputted in the video data input process, the drawing data in the raster format generated in the encoding process, and the voice data inputted in the voice data input process and generates composite data to be stored.

* * * * *